United States Patent
Ku et al.

(10) Patent No.: US 12,287,563 B2
(45) Date of Patent: Apr. 29, 2025

(54) APERTURE SET AND APERTURE SET DRIVING DEVICE

(71) Applicant: LG INNOTEK CO., LTD., Seoul (KR)

(72) Inventors: Bon Seok Ku, Seoul (KR); Kyung Won Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/371,278

(22) Filed: Sep. 21, 2023

(65) Prior Publication Data

US 2024/0012312 A1 Jan. 11, 2024

Related U.S. Application Data

(63) Continuation of application No. 17/771,873, filed as application No. PCT/KR2020/095142 on Nov. 11, 2020, now Pat. No. 11,796,892.

(30) Foreign Application Priority Data

Nov. 12, 2019 (KR) .......................... 10-2019-0144152

(51) Int. Cl.
*G03B 9/06* (2021.01)
*G02B 7/02* (2021.01)
*G03B 9/10* (2021.01)

(52) U.S. Cl.
CPC ................. *G03B 9/06* (2013.01); *G02B 7/02* (2013.01); *G03B 9/10* (2013.01)

(58) Field of Classification Search
CPC ..................................... G03B 9/06; G03B 9/10
See application file for complete search history.

(56) References Cited

U.S. PATENT DOCUMENTS

| 5,997,187 A | 12/1999 | Hamasaki |
| 11,226,539 B2 * | 1/2022 | Jun ........................ G03B 30/00 |
| 11,796,892 B2 * | 10/2023 | Ku ............................ G03B 9/10 |
| 2014/0119719 A1 | 5/2014 | Kozu et al. |

FOREIGN PATENT DOCUMENTS

| CH | 362311 A | 5/1962 | |
| CN | 1149927 A | 5/1997 | |
| CN | 101750839 A | 6/2010 | |
| JP | 5-11306 A | 1/1993 | |
| JP | 10-90752 A | 4/1998 | |
| JP | 2006-84658 A | 3/2006 | |
| JP | 2014-163968 A | 9/2014 | |
| JP | 2014-206650 A | 10/2014 | |
| JP | 2017058680 A * | 3/2017 | ............. G02B 5/005 |
| KR | 10-1024840 B1 | 3/2011 | |
| KR | 10-2016-0085075 A | 7/2016 | |
| KR | 10-2018-0105970 A | 10/2018 | |
| WO | WO 2016/111439 A1 | 7/2016 | |

* cited by examiner

*Primary Examiner* — Christopher E Mahoney
(74) *Attorney, Agent, or Firm* — Birch, Stewart, Kolasch & Birch, LLP

(57) ABSTRACT

An aperture set includes a support including a first opening overlapping with a lens, a rotor rotatably disposed on the support and including a second opening overlapping with the lens and the first opening, and a plurality of blades disposed on the support and respectively rotatably disposed on the rotor, wherein an inner surface of the blade for adjusting an amount of light incident on the lens includes a curved portion and a straight portion.

20 Claims, 12 Drawing Sheets

| F# | Angle | Stroke (mm) |
|---|---|---|
| 1.0 (Full open) | 0 | 0.000 |
| 1.4 | 2.4 | 0.182 |
| 2.0 | 4.3 | 0.351 |
| 2.8 | 5.9 | 0.498 |
| 4.0 | 7.1 | 0.617 |
| Inf (Full closed) | 11.5 | 1.700 |

APERTURE SET AND APERTURE SET DRIVING DEVICE

CROSS REFERENCE TO RELATED APPLICATIONS

This application is a Continuation of U.S. patent application Ser. No. 17/771,873 filed on Apr. 26, 2022, which is the National Phase of PCT/KR2020/095142 filed on Nov. 11, 2020, which claims priority under 35 U.S.C. § 119(a) to Patent Application No. 10-2019-0144152 filed in the Republic of Korea on Nov. 12, 2019, all of which are hereby expressly incorporated by reference into the present application.

TECHNICAL FIELD

This embodiment relates to an aperture set and an aperture set driving device.

BACKGROUND ART

As the spread of various portable terminals is widely generalized and wireless Internet services are commercialized, the demands of consumers related to portable terminals are also diversifying, so that various types of additional devices are being installed in the portable terminals.

Among them, there is a camera module for photographing a subject as a photograph or a moving picture. Meanwhile, an autofocus (AF) function for automatically adjusting a focus according to a distance of a subject is applied to a recent camera module.

In addition, a hand shake correction function (optical image stabilization, i.e., OIS) that prevents the image from being shaken due to hand shake of the photographer is applied.

In addition, configurations including an aperture device for the camera module to implement additional functions have been proposed.

DETAILED DESCRIPTION OF THE INVENTION

Technical Subject

An object of the present invention is to provide an aperture set and an aperture set driving device capable of improving space efficiency and allowing light to pass through close to a circle.

Technical Solution

As one embodiment, the aperture set comprises: a support including a first opening being overlapped with a lens; a rotor rotatably disposed on the support and including a second opening being overlapped with the lens and the first opening; and a plurality of blades disposed on the support and respectively rotatably disposed on the rotor, wherein an inner surface of the blade for adjusting the amount of light incident on the lens includes a curved portion and a straight portion.

When the amount of light incident on the lens is the maximum, the amount of light incident on the lens is determined by the curved portion of the plurality of blades, and as the amount of light incident on the lens decreases from the maximum value, the amount of light incident on the lens may be determined by the curved portion and the straight portion of the plurality of blades.

The rotor may include a first guide part, and the blade may include a coupling part fixed to the support and a second guide part corresponding to the first guide part.

The first guide part may include a guide protrusion, the second guide part may include a first guide hole, and the size of the cross-section of the guide hole may be larger than the size of the cross-section of the guide protrusion.

The aperture set may satisfy Equation 1: $X = L2 - L1/L1 * \theta1$ (here X is the linear movement distance of the second guide part with respect to the first guide part, L2 is the length between the center of the blade and the center of the first guide part, L1 is the length between the center of the lens and the center of the coupling part, and $\theta1$ is the angle between a second guide part and x-axis).

The aperture set may satisfy Equation 2: $2*L4 < L3 < 2.5*L4$ (here L3 is the length between one end of the curved portion at one end of the blade, and L4 is the length between the region where the curved portion and the straight portion meet at one end of the blade).

The plurality of blades includes four blades.

The aperture set driving device comprises: a support including a first aperture being overlapped with the lens; a rotor rotatably disposed on the support and including a second opening being overlapped with the lens and the first opening; a plurality of blades disposed on the support and being rotatably disposed on the rotor, respectively; a holder being disposed on one side of the support; a first driving unit being disposed on the holder; and a second driving unit facing the first driving unit, wherein the holder includes a third guide part, and wherein the rotor includes a fourth guide part corresponding to the third guide part.

The third guide part includes a guide rod; the fourth guide part includes a second guide hole penetrated by the guide rod; and the size of the cross-section of the second guide hole may be formed to be larger than the size of the cross-section of the guide rod.

When the guide rod moves in the first direction, the rotor rotates in one direction with respect to a first axis, and each of the plurality of blades may rotate in the one direction with respect to the first axis.

Advantageous Effects

According to the present invention, an aperture set and an aperture set driving device capable of improving the space efficiency and allowing light to pass through close to a circle can be provided.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under) ", the meaning of not only an upward direction but also a downward direction based on one component may be included.

An 'optical axis direction' used below is defined as an optical axis direction of a lens coupled to the lens driving device. Meanwhile, the 'optical axis direction' may correspond to a 'up and down direction', a 'z-axis direction', and the like. Hereinafter, the present invention will be described in more detail with reference to the accompanying drawings.

Figure 1:
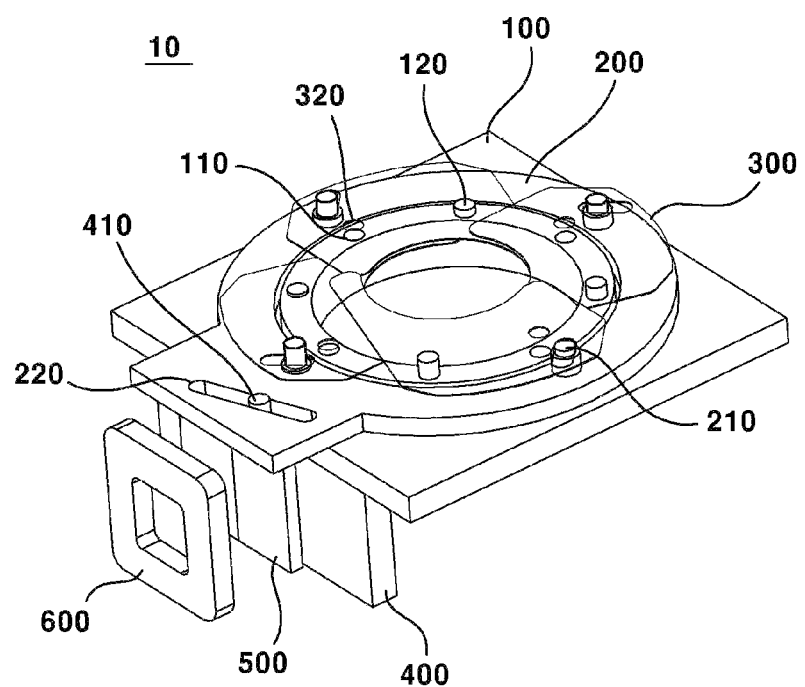
FIG. 1 is a perspective view of an aperture set driving device according to an embodiment of the present invention.
Figure 2:
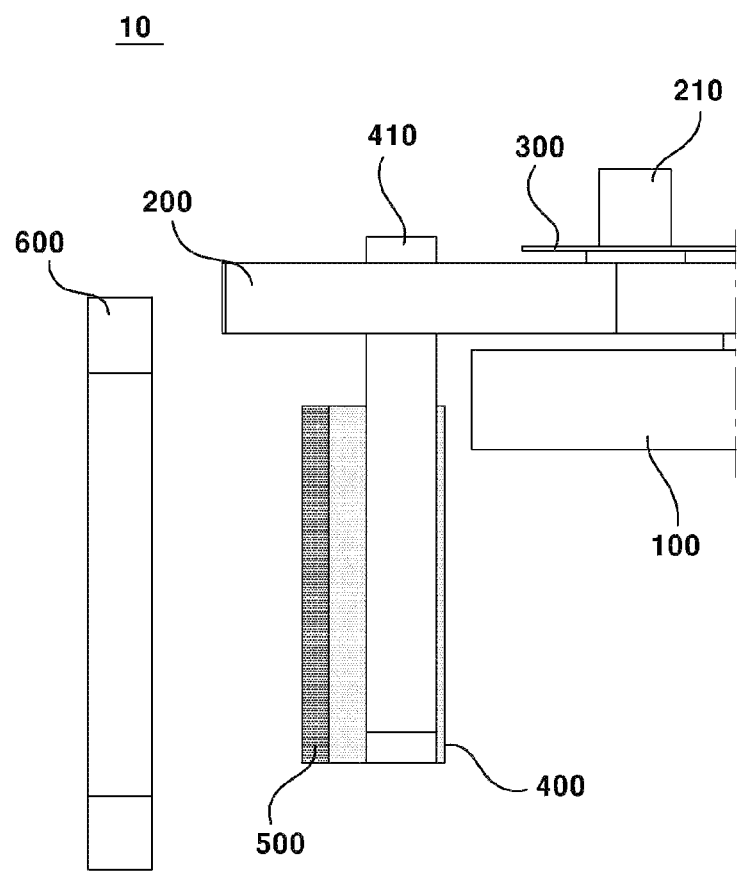
FIG. 2 is a side view of an aperture set driving device according to an embodiment of the present invention.
Figure 3:
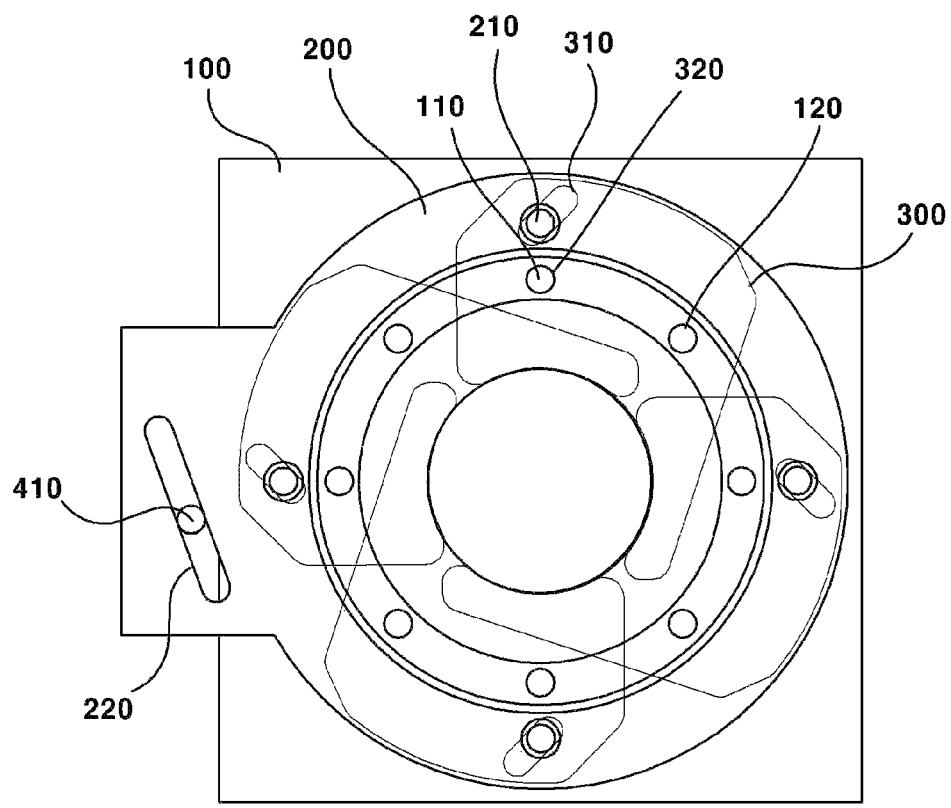
FIGS. 3 to 5 are operational diagrams of an aperture set driving device according to an embodiment of the present invention.
Figure 4:
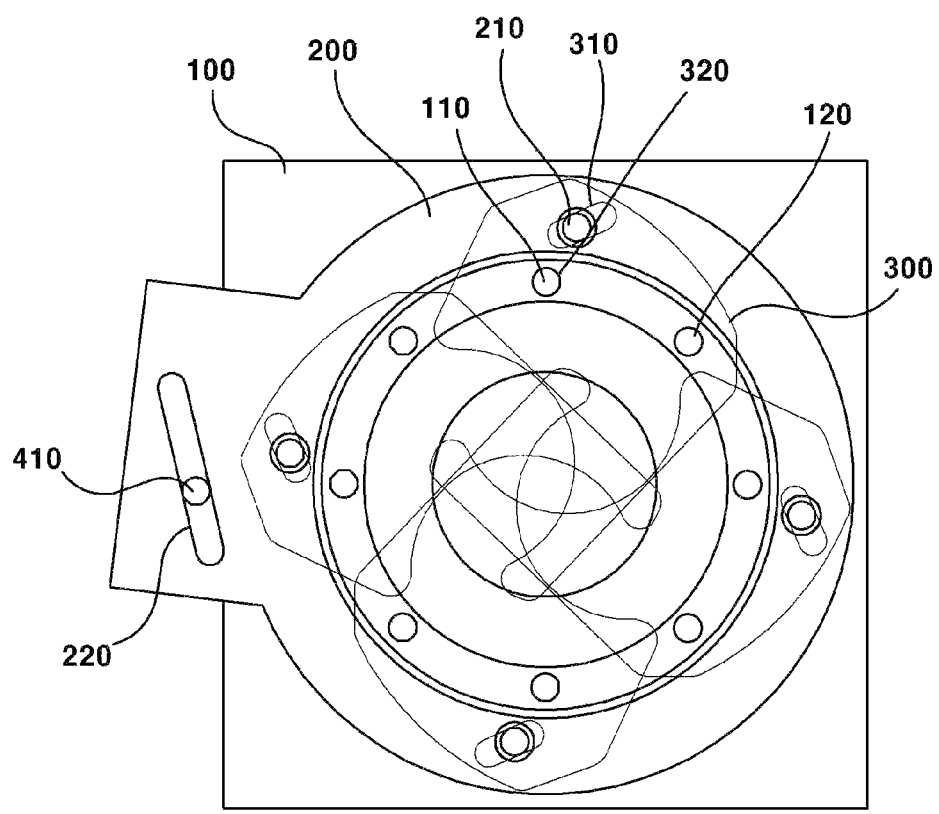
Figure 5:
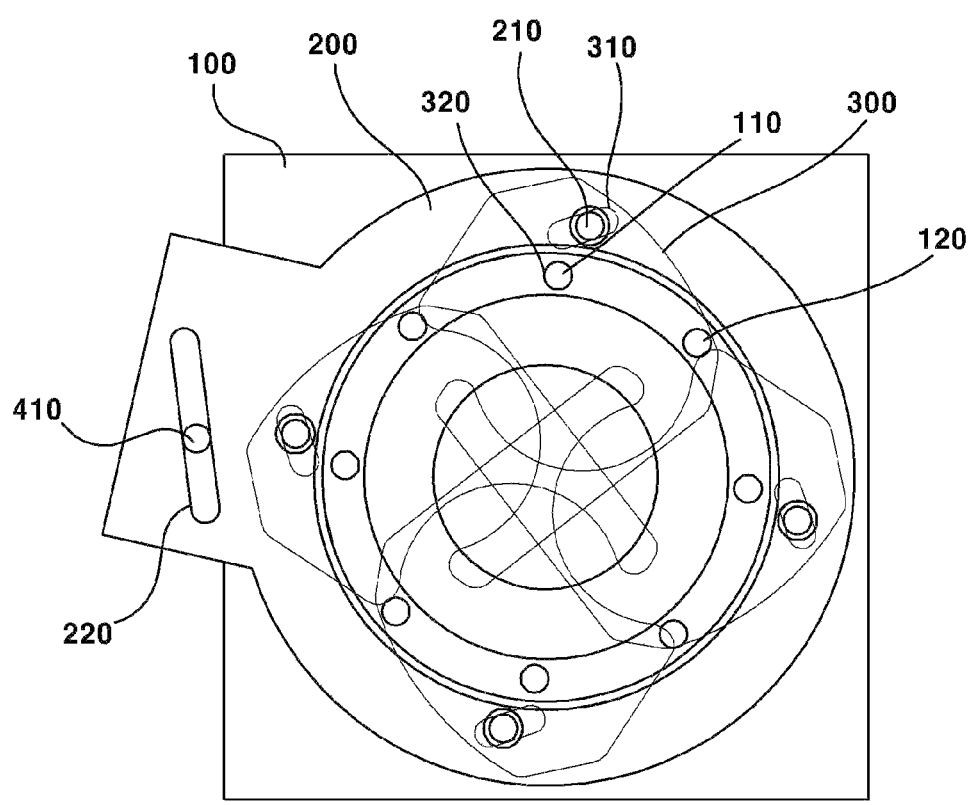
Figures 6, 7:
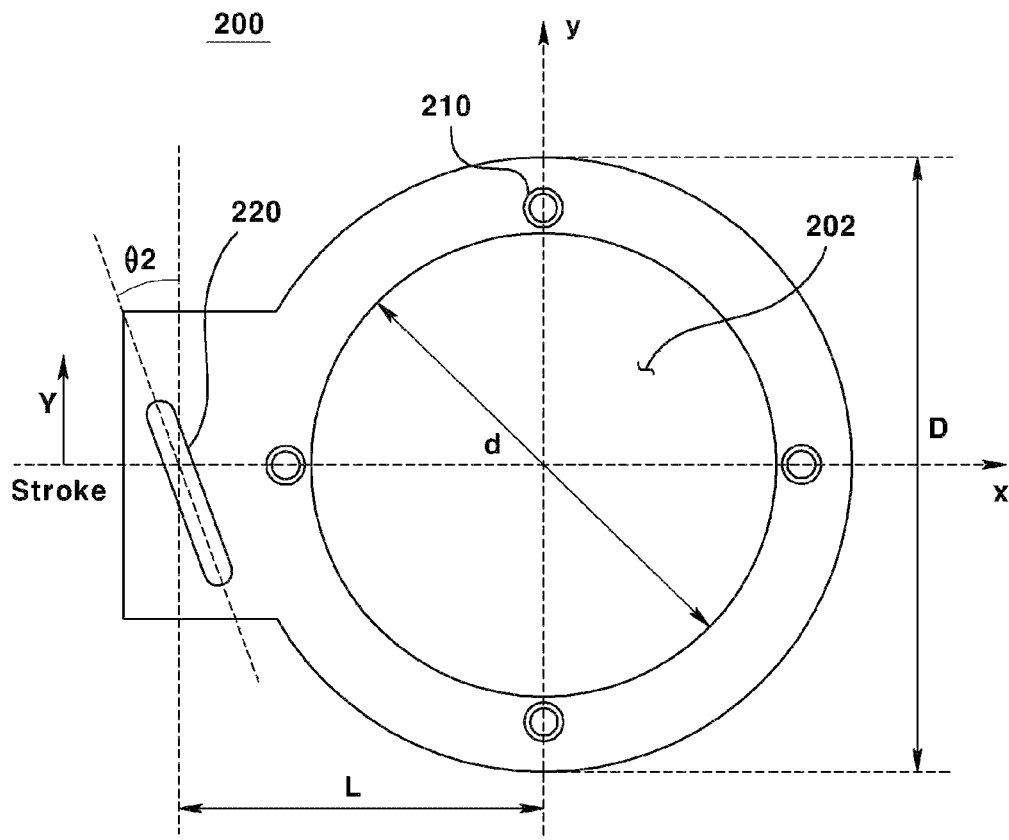
FIG. 6 is a plan view of a partial configuration of an aperture set driving device according to an embodiment of the present invention.
FIG. 7 is a table showing a driving angle and an F-number with respect to a driving stroke of an aperture set driving device according to an embodiment of the present invention.
Figure 8:
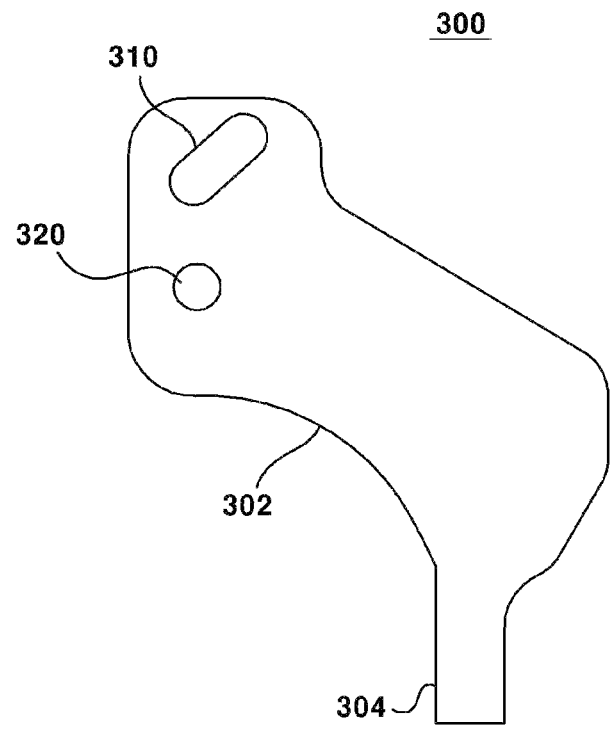
FIG. 8 is a plan view of a partial configuration of an aperture set driving device according to an embodiment of the present invention.
Figure 9:
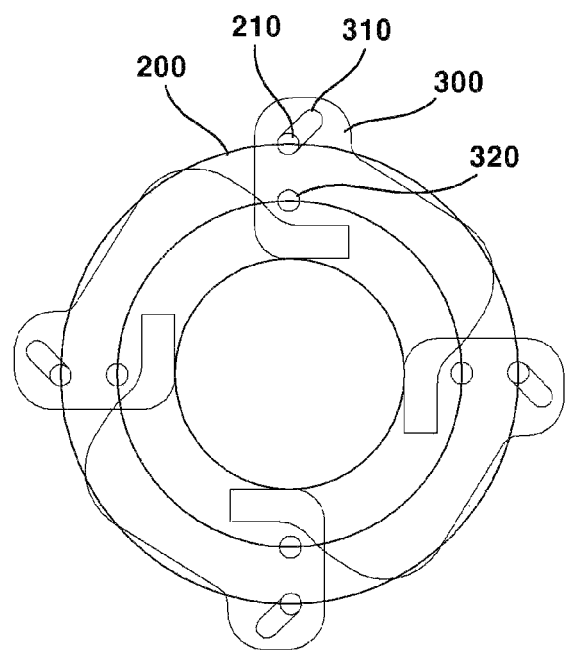
FIGS. 9 to 14 are operational diagrams of an aperture set driving device according to an embodiment of the present invention.
Figure 10:
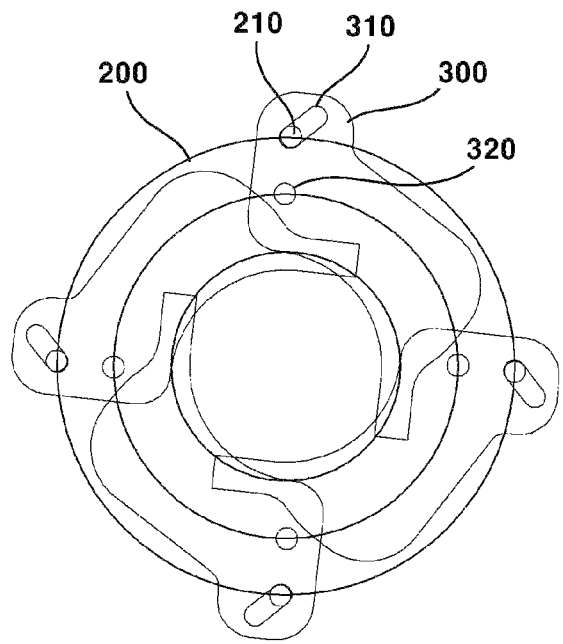
Figure 11:
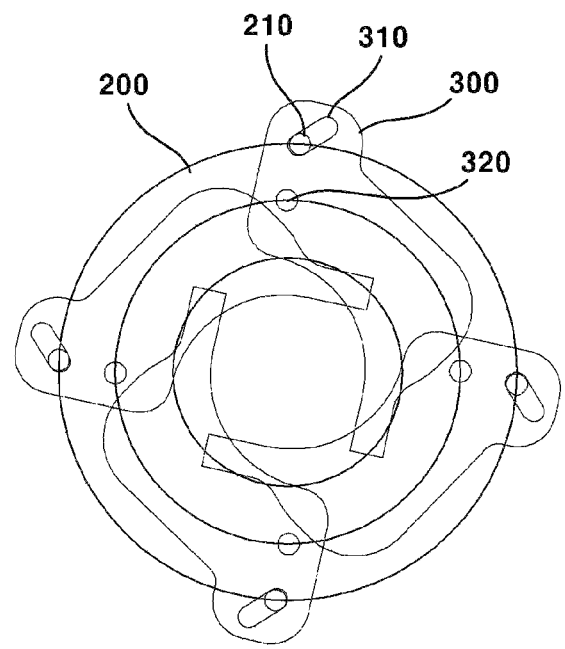
Figure 12:
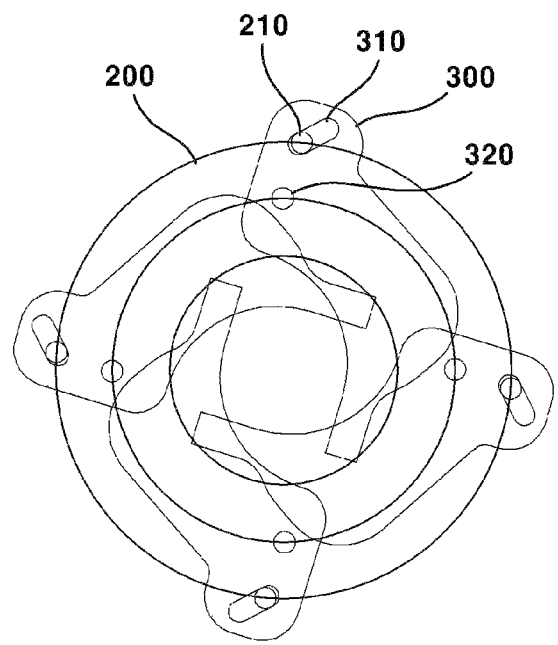
Figure 13:
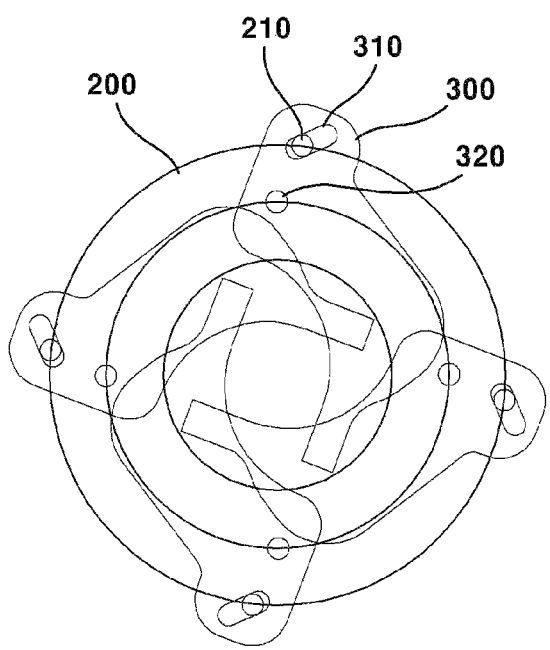
Figure 14:
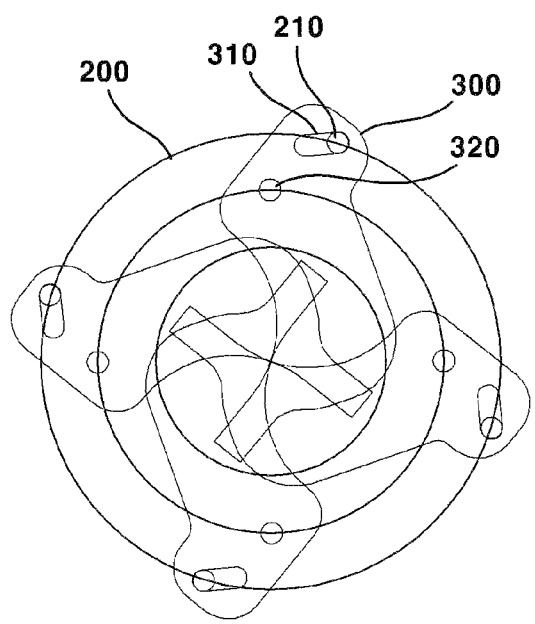
Figure 16:
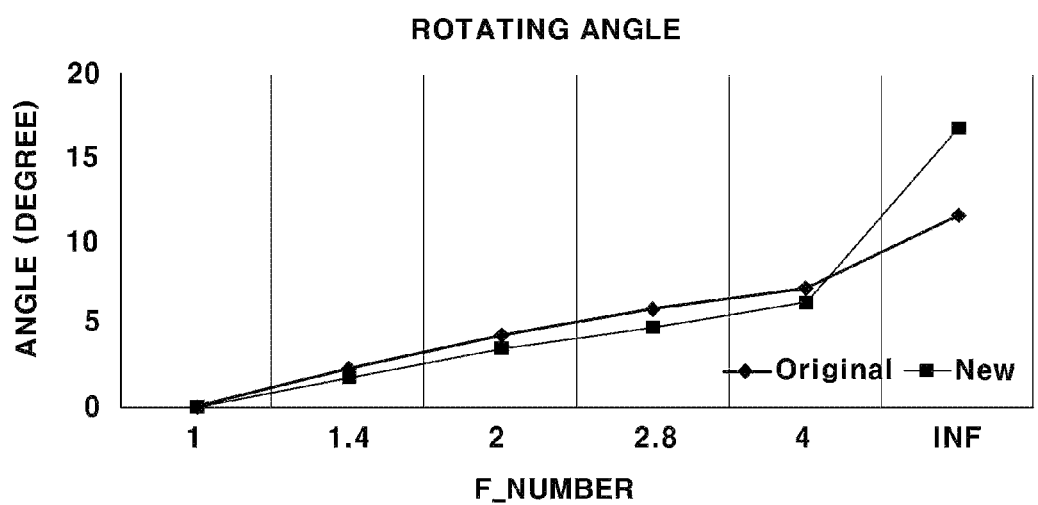
FIG. 16 is a graph illustrating a driving angle according to an F-number of an aperture set driving device according to an embodiment of the present invention.
Figure 17:
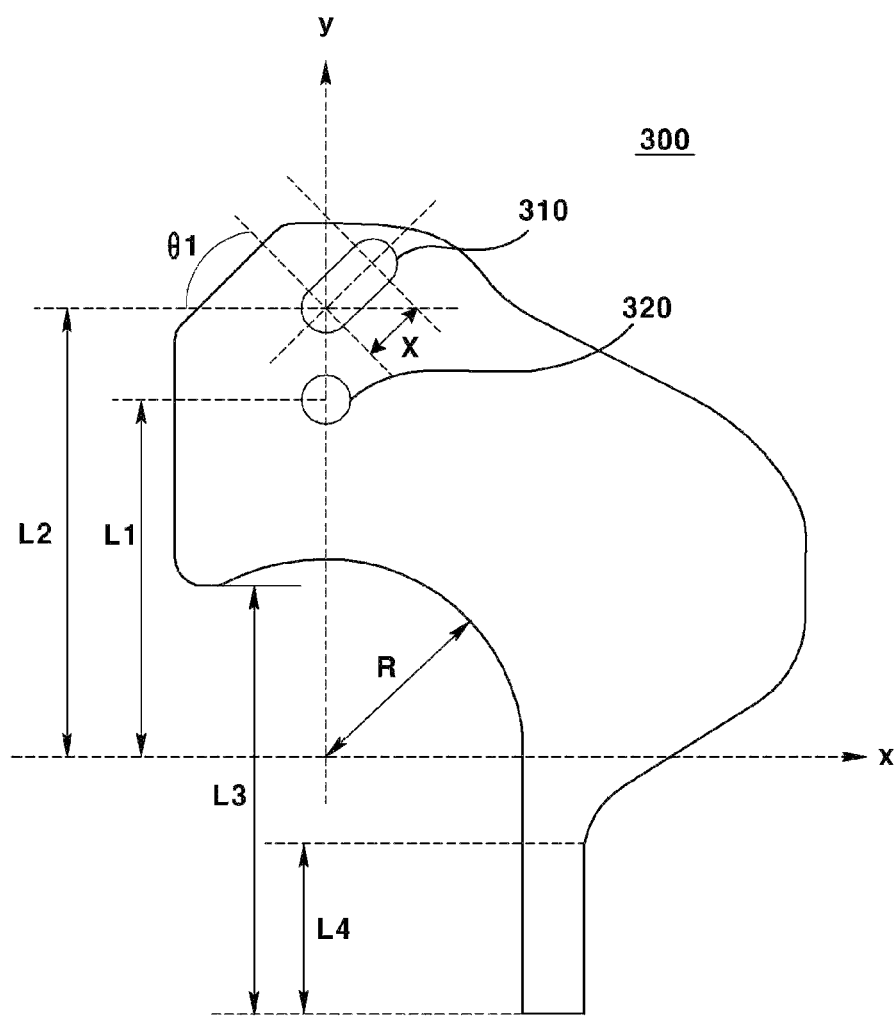
FIG. 17 is a plan view of a partial configuration of an aperture set driving device according to an embodiment of the present invention.

FIG. 1 is a perspective view of an aperture set driving device according to an embodiment of the present invention. FIG. 2 is a side view of an aperture set driving device according to an embodiment of the present invention. FIGS. 3 to 5 are operational diagrams of an aperture set driving device according to an embodiment of the present invention. FIG. 6 is a plan view of a partial configuration of an aperture set driving device according to an embodiment of the present invention. FIG. 7 is a table showing a driving angle and an F-number with respect to a driving stroke of an aperture set driving device according to an embodiment of the present invention. FIG. 8 is a plan view of a partial configuration of an aperture set driving device according to an embodiment of the present invention. FIGS. 9 to 14 are operational diagrams of an aperture set driving device according to an embodiment of the present invention. FIG. is a graph illustrating circularity according to F-number of an aperture set driving device according to an embodiment of the present invention. FIG. 16 is a graph illustrating a driving angle according to an F-number of an aperture set driving device according to an embodiment of the present invention. FIG. 17 is a plan view of a partial configuration of an aperture set driving device according to an embodiment of the present invention.

Referring to FIGS. 1 to 17, an aperture set driving device 10 according to an embodiment of the present invention may comprise a support 100, a rotor 200, a blade 300, a holder 400, a first driving unit 500, and a second driving unit 600, but may be implemented except for some of these configurations, and does not exclude additional configurations.

The aperture set driving device 10 according to an embodiment of the present invention may comprise an aperture set. The aperture set may include a support 100, a rotor 200, and a blade 300, but may be implemented except for some of these configurations, and does not exclude additional configurations.

The aperture set driving device 10 may include a support 100. The support 100 may include a first opening being overlapped with the lens (not shown). The first opening may be formed in a circular shape. The support 100 may be disposed above the lens. The rotor 200 may be disposed above the support 100. A first driving unit 500 and a second driving unit 600 may be disposed at one side of the support 100. Specifically, the support 100 may be disposed in a direction perpendicular to the first driving unit 500 and the second driving unit 600. The support 100 may be formed in a square plate shape.

The support 100 may include a protruded part being disposed adjacent to a first opening and being protruded upward. The protruded part may be disposed at an inner side of a second opening 202 of the rotor 200. The protruded part may be formed in a circular band shape. The height of the protruded part may be formed to be higher than the height of the rotor 200.

The support 100 may include a second coupling part 110. The first coupling part 320 of the blade 300 may be coupled to a second coupling part 110. The second coupling part 110 may be protruded upwardly on the protruded part of the support 100. The second coupling part 110 may include a protrusion. When the second coupling part 110 is a protrusion, the first coupling part 320 may be a hole, and in this case, the first coupling part 320 may be disposed in the second coupling part 110 and fixed with an adhesive. The second coupling part 110 may include a plurality of second coupling parts. The number of the plurality of second coupling parts may correspond to the number of the plurality of blades 300.

Unlike this, in a state in which the second coupling part 110 does not penetrate the first coupling part 320, the second coupling part 110 and the first coupling part 320 may be bonded through an adhesive such as an epoxy.

The support 100 may include a support unit 120. The support unit 120 may be formed to be protruded upward from an upper surface of the support 100. The support unit 120 may be formed to be protruded upward on the protruded part of the support 100. The support unit 120 may be in contact with the blade 300. An upper surface of the support unit 120 may be in contact with a lower surface of the blade 300. Through this, since the support unit 120 supports the lower surface of the blade 300 when the blade 300 rotates, sagging of the blade 300 can be prevented. Unlike this, the support unit 120 may be removed from the support 100.

The aperture set driving device 10 may include a rotor 200. The rotor 200 may be disposed on the support 100. The rotor 200 may be coupled to the support 100. The rotor 200 may be rotatably coupled to the support 100. The rotor 200 may rotate in one direction or the other direction by the first driving unit 500 and the second driving unit 600.

The rotor 200 may include a second opening 202. The second opening 202 may be overlapped or superimposed with the first opening of the support 100 in an optical axis direction. The second opening 202 may be overlapped or superimposed with the lens in the optical axis direction. The second opening 202 may be formed in a circular shape. A protruded part of the support 100 may be disposed at an inner side of the second opening 202.

The rotor 200 may include a first guide part 210. The first guide part 210 may be disposed in an area adjacent to the second opening 202. The first guide part 210 may correspond to the second guide part 310 of the blade 300. The first guide part 210 may include a guide protrusion. The first guide part 210 may include a guide protrusion being protruded upward from an upper surface of the rotor 200 in an area adjacent to the opening 202. The size of the cross-section of the first guide part 210 may be smaller than the size of the cross-section of the second guide part 310. Through this, each of the plurality of blades 300 may be rotated in one direction or in the other direction when the rotor 200 rotates in one direction or the other direction. The first guide part 210 may include a plurality of first guide parts 210. The number of the plurality of first guide parts 210 may correspond to the number of the plurality of blades.

The rotor 200 may include a fourth guide part 220. The fourth guide part 220 may correspond to the third guide part 410 of the holder 400. The fourth guide part 220 may include a second guide hole. The fourth guide part 220 may be penetrated by the third guide part 410. The size of the cross-section of the fourth guide part 220 may be larger than the size of the cross-section of the third guide part 410. When the third guide part 410 moves in a straight direction by the first driving unit 500 and the second driving unit 600, the fourth guide part 220 may rotate in one direction to rotate the rotor 200 in one direction or the other.

The rotor 200 may include a circular part disposed adjacent to the second opening 202, and an extension part being extended from the circular part to one side. The circular part of the rotor 200 may be disposed adjacent to the protruded part and/or the first opening of the support 100. The extension part of the rotor 200 may be extended to one side of the support 100. At this time, the first guide part 210 may be disposed at the circular part of the rotor 200, and the fourth guide part 220 may be disposed in the extension part of the rotor 200.

The aperture set driving device 10 may include a guide member (not shown). The guide member may be disposed between the support 100 and the rotor 200. Specifically, the guide member may be disposed between an upper surface of the support 100 and a lower surface of the rotor 200. The guide member may include a guide ball. A first guide groove (not shown) may be formed on one surface or an upper surface of the support 100. The first guide groove may be formed in a circular band shape. A second guide groove (not shown) may be formed on one surface or a lower surface of the rotor 200. The second guide groove may be formed in a circular band shape. The first guide groove and the second guide groove may be formed to have a shape corresponding to each other and a corresponding size. The guide ball may be disposed in the first guide groove. The guide ball may be disposed in the second guide groove. In this case, a cross section of one of the first and second guide grooves in contact with the guide ball may be formed in a 'U' shape, and the other cross section may be formed in a 'V' shape. That is, one of the guide ball and the first and second guide grooves may be in contact with at one point, and the other may be in contact with at two points. Through this, the rotor 200 may be rotatable in one direction or the other direction with respect to the support 100, and frictional force generated between the rotor 200 and the support 100 may be reduced.

The aperture set driving device 10 may include a blade 300. The blade 300 may be disposed in the support 100. The blade 300 may be disposed on the support 100. The blade 300 may be coupled to the support 100.

The blade 300 may be disposed in the rotor 200. The blade 300 may be rotatably disposed in the rotor 200. A part of the blade 300 is fixed on the support 100, and the other part is rotatably disposed on the rotor 200 so that when the rotor 200 rotates in one direction or the other direction, it may rotate in one direction or the other direction with respect to the support 100.

The blade 300 may include a first coupling part 320. The first coupling part 320 may be coupled to the support 100. The first coupling part 320 may be coupled to a protruded part of the support 100. The first coupling part 320 may be coupled to the second coupling part 110 of the support 100. The first coupling part 320 may include a hole. The first coupling part 320 may be inserted into the second coupling part 110 having a protrusion shape. In this case, an adhesive may be applied to the first coupling part 320 and the second coupling part 110 to fix the first coupling part 320 to the second coupling part 110. Through this, the blade 300 may rotate with respect to the second coupling part 110.

The blade 300 may include a second guide part 310. The second guide part 310 may correspond to the first guide part 210 of the rotor 200. The second guide part 310 may include a guide hole. When the second guide part 310 is a guide hole, the first guide part 210 may be a guide protrusion. In this case, the size of the cross-section of the second guide part 310 may be larger than the size of the cross-section of the first guide part 210. The second guide part 310 may form a predetermined angle with the x-axis. Referring to FIGS. 9 to 14, when the rotor 200 rotates in one direction or the other, the first guide part 210 may rotate the blade 300 in one direction or the other by pushing the second guide part 310.

The blade 300 may include a plurality of blades. The plurality of blades may include four blades. The four blades are spaced apart from one another and may be formed in a shape corresponding to one another. When the rotor 200 rotates in one direction or the other direction, the amount of light passing through the first opening and/or the second opening 202 may be adjusted as each of the plurality of blades 300 is being rotated in one direction or the other.

The inner surface for controlling the amount of light incident on the lens of the blade 300 may include a curved portion 302 and a straight portion 304. The curved portion 302 and the straight portion 304 may be connected to each other.

When the amount of light incident on the lens is the maximum, the amount of light incident on the lens may be determined by the curved portion 302 of each of the plurality of blades. As the amount of light incident on the lens decreases from the maximum value, the amount of light incident on the lens may be determined by the curved portion 302 and the straight portion 304 of each of the plurality of blades. Since the amount of light incident to the lens is determined by both the curved portion 302 and the straight portion 304 of each of the plurality of blades 300, the area between the plurality of blades 300 is formed to be close to a circular shape and can be gradually increased or decreased, and the shape of the cross-section of the light incident on the lens is formed to be close to a circular shape and can be increased or decreased.

The aperture set driving device 10 may include a holder 400. The holder 400 may be disposed at one side of the support 100. The holder 400 may be disposed below the rotor 200. The holder 400 may be disposed below the extension part of the rotor 200. The holder 400 may be formed to be extended in a vertical direction. A first driving unit 500 may be disposed in the holder 400.

The holder 400 may include a third guide part 410. The third guide part 410 may correspond to the fourth guide part 220. The third guide part 410 may include a guide protrusion or a guide rod. When the third guide part 410 is a guide protrusion or a guide rod, the fourth guide part 220 may be a guide hole. The size of the cross-section of the third guide part 410 may be smaller than the size of the cross-section of the fourth guide part 220. When the third guide part 410 moves in a linear direction by the interaction between the first driving part 500 and the second driving part 500, the third guide part 410 may be rotated by pushing the fourth guide part 220.

Referring to FIGS. 3 to 5, when the third guide part 410 moves in the first direction, the rotor 200 may rotate in one direction with respect to the first axis or the optical axis, and each of the plurality of blades 300 may rotate in one direction with respect to a first axis or an optical axis. Conversely, when the third guide part 410 moves in the opposite direction to the first direction, the rotor 200 may rotate in the other direction with respect to the first axis or the optical axis; and each of the plurality of blades 300 may rotate in the other direction with respect to the first axis or the optical axis.

The aperture set driving device 10 may include a first driving unit 500. The first driving unit 500 may be disposed on the holder 400. The first driving unit 500 may be fixed to the holder 400. The first driving unit 500 may face the second driving unit 600. The first driving unit 500 may include a magnet or a coil. When the first driving unit 500 is a magnet, the second driving unit 600 may be a coil. When the first driving unit 500 is a coil, the second driving unit 600 may be a magnet. The first driving unit 500 may move in a first direction or in a direction opposite to the first direction with respect to the second driving unit 600 through electromagnetic interaction with the second driving unit 600.

The aperture set driving device 10 may include a second driving unit 600. The second driving unit 600 may be fixed to an external component or another component of the aperture set driving device 10. The second driving unit 600 may face the first driving unit 500. The second driving unit 600 may include a magnet or a coil. When the second driving unit 600 is a magnet, the first driving unit 500 may be a coil. When the second driving unit 600 is a coil, the first driving unit 500 may be a magnet. The second driving unit 600 may move the first driving unit 500 in a first direction or in a direction opposite to the first direction with respect to the second driving unit 600 through electromagnetic interaction with the first driving unit 500.

The first driving unit 500 and/or the second driving unit 600 may be disposed in a direction perpendicular to the support 100 and/or the rotor 200. Specifically, when the support 100 and/or the rotor 200 are disposed in a horizontal direction, the first driving unit 500 and/or the second driving unit 600 may be disposed in a vertical direction. Through this, the space efficiency can be enhanced.

The aperture set according to an embodiment of the present invention may satisfy Equation 1.

$$X = \frac{L2 - L1}{L1} * \theta 1. \quad \text{[Equation 1]}$$

Referring to FIG. 17, it means that: X is the linear movement distance of the second guide part 310 with respect to the first guide part 210; L2 is the length between the center of the first guide part 210 and the center of the blade 300; L1 is the length between the center of the lens and the center of the first coupling part 320; and θ1 is the angle between a second guide part 310 and x-axis.

The aperture set according to an embodiment of the present invention may satisfy Equation 2.

$$2*L4 < L3 < 2.5*L4. \quad \text{[Equation 2]}$$

Referring to FIGS. 8 and 17, it means that L3 is a length between one end of the blade 300 and one end of the curved portion 302, and L4 is the length between the region where the curved portion 302 and the straight portion 304 meet at one end of the blade 300.

The aperture set driving device 10 according to an embodiment of the present invention may satisfy Equation 3.

Figure 15:
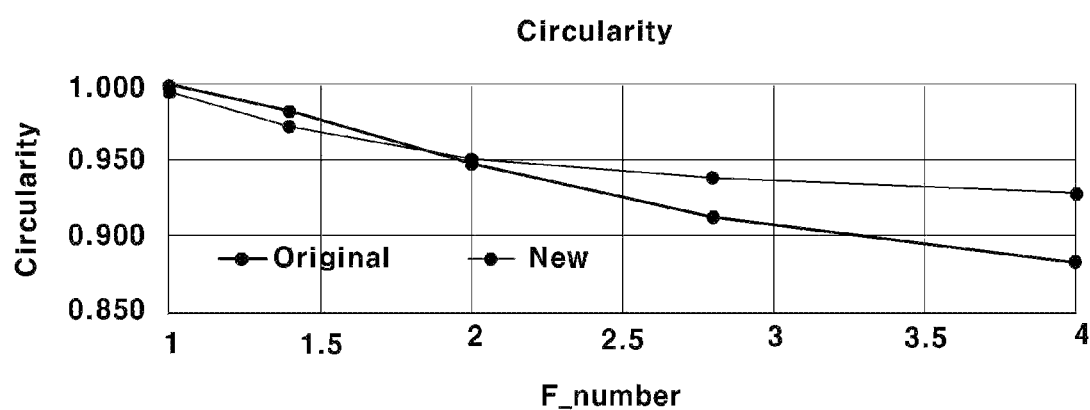
FIG. 15 is a graph illustrating circularity according to F-number of an aperture set driving device according to an embodiment of the present invention.

Referring to FIGS. 9 to 14, when the amount of light incident on the lens is the maximum, the amount of light incident on the lens may be determined by the curved portion 302 of each of the plurality of blades. As the amount of light incident on the lens decreases from the maximum value, the amount of light incident on the lens may be determined by the curved portion 302 and the straight portion 304 of each of the plurality of blades. Referring to FIGS. 15 and 16, since the amount of light incident to the lens is determined by both the curved portion 302 and the straight portion 304 of each of the plurality of blades 300, the area between the plurality of blades 300 is formed to be close to a circular shape and may be gradually increased or decreased, and the shape of a cross-section of light incident on the lens may be formed to be close to a circular shape and can be increased or decreased.

$$Y = \frac{\text{Rotor Angle}}{L * \theta 2}. \quad \text{[Equation 3]}$$

Referring to FIG. 6, Y is the movement stroke of the third guide part 410, Rotor Angle is a rotor rotation angle, L is the length between the center of the third guide part 410 and the center of the lens, and θ2 may satisfy the angle between y-axis and the fourth guide part 220.

In addition, the reference numeral D in FIG. 6 means the outer diameter of the rotor 200, and the reference numeral d denotes the inner diameter of the rotor 200 or the diameter of the second opening 202.

Referring to FIG. 7, when the F number is 1, that is, when the amount of light incident on the lens is the maximum, the rotation angle of the rotor 200 is 0 degrees, and the movement stroke of the third guide part 410 may be 0. As the F number decreases, that is, as the amount of light incident on the lens decreases from the maximum value, the rotation angle of the rotor 200 and the movement stroke of the third guide part 410 may increase. In an embodiment of the present invention, when the amount of light incident on the lens is at a minimum or no value, the rotation angle of the rotor 200 may be 11.5 degrees and the movement stroke of the third guide part 410 may be 1.7 mm.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:

1. An aperture set comprising:
a support including a first opening being overlapped with a lens;
a rotor rotatably disposed on the support and including a second opening being overlapped with the lens and the first opening;
a plurality of blades disposed on the support and respectively rotatably disposed on the rotor; and
a holder including a third guide part,
wherein the rotor includes a first guide part and a fourth guide part, the fourth guide part corresponding to the third guide part,
wherein the fourth guide part is fully enclosed inside the rotor and the third guide part is fully enclosed in the fourth guide part, and
wherein the blade includes a coupling part fixed to the support and a second guide part corresponding to the first guide part.

2. The aperture set according to claim 1, wherein the first guide part includes a guide protrusion,
wherein the second guide part includes a first guide hole, and
wherein a size of a cross-section of the first guide hole is larger than a size of a cross-section of the guide protrusion.

3. The aperture set according to claim 1, wherein an inner surface of the blade for adjusting an amount of light incident on the lens includes a curved portion and a straight portion.

4. The aperture set according to claim 3, wherein when the amount of light incident on the lens is a maximum, the amount of light incident on the lens is determined by the curved portion of the plurality of blades, and
wherein as the amount of light incident on the lens decreases from the maximum, the amount of light incident on the lens is determined by the curved portion and the straight portion of the plurality of blades.

5. The aperture set according to claim 2, wherein the aperture set satisfies $$X = \frac{L2 - L1}{L1} * \theta 1,\qquad\text{Equation 1}$$

where X is a linear movement distance of the second guide part with respect to the first guide part, L2 is a length between a center of the blade and a center of the first guide part, L1 is a length between a center of the lens and a center of the coupling part, and θ1 is an angle between the second guide part and x-axis.

6. The aperture set according to claim 1, wherein the aperture set satisfies $$2*L4 < L3 < 2.5*L4,\qquad\text{Equation 2:}$$

where L3 is a length between one end of the curved portion at one end of the blade, and L4 is a length between a region where the curved portion and the straight portion meet at one end of the blade.

7. The aperture set according to claim 1, wherein the plurality of blades includes four blades.

8. An aperture set driving device comprising:
a support including a first aperture being overlapped with a lens;
a rotor rotatably disposed on the support and including a second opening being overlapped with the lens and a first opening;
a plurality of blades disposed on the support and being rotatably disposed on the rotor, respectively;
a holder being disposed on one side of the support;
a first driving unit being disposed on the holder; and
a second driving unit facing the first driving unit,
wherein the holder includes a third guide part,
wherein the rotor includes a fourth guide part corresponding to the third guide part,
wherein the fourth guide part is fully enclosed inside the fully enclosed inside the rotor and the third guide part is fully enclosed in the fourth guide part,
wherein the rotor includes a first guide part, and
wherein the blade includes a coupling part fixed to the support and a second guide part corresponding to the first guide part.

9. The aperture set driving device according to claim 8, wherein the third guide part includes a guide rod,
wherein the fourth guide part includes a second guide hole being penetrated by the guide rod, and
wherein a size of a cross-section of the second guide hole is formed to be larger than a size of a cross-section of the guide rod.

10. The aperture set driving device according to claim 9, wherein when the guide rod moves in a first direction, the rotor rotates in one direction with respect to a first axis, and each of the plurality of blades rotates in the one direction with respect to the first axis, and
wherein a movement of the guide rod is restricted by the second guide hole and a movement of the rotor is restricted by the guide rod.

11. The aperture set driving device according to claim 8, wherein the first guide part includes a guide protrusion,
wherein the second guide part includes a first guide hole, and
wherein a size of a cross-section of the guide hole is larger than a size of a cross-section of the guide protrusion.

12. The aperture set driving device according to claim 8, wherein an inner surface of the blade for adjusting an amount of light incident on the lens includes a curved portion and a straight portion.

13. The aperture set driving device according to claim 12, wherein when the amount of light incident on the lens is a maximum, the amount of light incident on the lens is determined by the curved portion of the plurality of blades, and wherein as the amount of light incident on the lens decreases from the maximum, the amount of light incident on the lens is determined by the curved portion and the straight portion of the plurality of blades.

14. The aperture set driving device according to claim 13, wherein the aperture set driving device satisfies $$X = \frac{L2 - L1}{L1} * \theta1, \quad \text{Equation 1}$$

where X is a linear movement distance of the second guide part with respect to the first guide part, L2 is a length between a center of the blade and a center of the first guide part, L1 is a length between a center of the lens and a center of the coupling part, and $\theta1$ is an angle between a second guide part and x-axis.

15. The aperture set driving device according to claim 8, wherein the aperture set driving device satisfies $$2*L4 < L3 < 2.5*L4, \quad \text{Equation 2:}$$

where L3 is a length between one end of the curved portion at one end of the blade, and L4 is a length between a region where the curved portion and the straight portion meet at one end of the blade.

16. The aperture set driving device according to claim 8, wherein the plurality of blades includes four blades.

17. The aperture set driving device according to claim 8, wherein the first driving unit and the second driving unit are disposed perpendicular to the support and the rotor.

18. The aperture set driving device according to claim 8, wherein a guide ball is disposed between the support and the rotor.

19. The aperture set driving device according to claim 8, wherein one of the support and the rotor contacts a guide ball at one point, and the other of the support and the rotor contacts the guide ball at two points.

20. The aperture set driving device according to claim 8, wherein the aperture set driving device satisfies $$Y = \frac{\text{Rotor Angle}}{L * \theta2}, \quad \text{Equation 3}$$

where Y is a movement stroke of the third guide part, Rotor Angle is a rotation angle of the rotor, L is a length between a center of the third guide part and a center of the lens, and $\theta2$ is an angle between a y-axis and the fourth guide part.

* * * * *